United States Patent
Hall et al.

(10) Patent No.: US 11,543,801 B2
(45) Date of Patent: Jan. 3, 2023

(54) ACCESS SYSTEM FOR A STRUCTURE

(71) Applicant: Hall Labs LLC, Provo, UT (US)

(72) Inventors: David R Hall, Provo, UT (US); Chris Jones, Spanish Fork, UT (US); Trevor Bodily, Lindon, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 333 days.

(21) Appl. No.: 16/805,732

(22) Filed: Feb. 29, 2020

(65) Prior Publication Data

US 2021/0271227 A1  Sep. 2, 2021

(51) Int. Cl.
*G05B 19/4155* (2006.01)
*G06Q 10/08* (2012.01)
*G06K 7/14* (2006.01)
*H04W 12/06* (2021.01)

(52) U.S. Cl.
CPC ....... *G05B 19/4155* (2013.01); *G06K 7/1413* (2013.01); *G06K 7/1417* (2013.01); *G06Q 10/0832* (2013.01); *G06Q 10/0833* (2013.01); *H04W 12/06* (2013.01); *G05B 2219/40062* (2013.01)

(58) Field of Classification Search
CPC ...... G05B 19/4155; G05B 2219/40062; G06K 7/1413; G06K 7/1417; G06Q 10/0832; G06Q 10/0833; H04W 12/06; H04W 12/63; H04W 12/77; G06F 21/32
See application file for complete search history.

(56) References Cited

U.S. PATENT DOCUMENTS

2019/0282015 A1* 9/2019 High ............... A47G 29/141

OTHER PUBLICATIONS

Umbarkar, S., et al. "Keypad/Bluetooth/GSM Based Digital Door Lock Security System." ICCASP/ICMMD 137 (2016): 749-757. (Year: 2016).*

* cited by examiner

*Primary Examiner* — Matthew Mikels

(57) ABSTRACT

An access system and system for enabling a package to be delivered to a house are disclosed. The access unit includes a keypad, a light, and an activatable open button. The access unit opens a door to the structure when the button is pressed while active. The access unit also includes an authentication module configured to communicate via Bluetooth with a package delivery unit when the package delivery unit reaches a predetermined delivery distance near the structure and to authenticate the package delivery unit. The access unit also includes an execution module configured to store one or more rules pertaining to delivery of a package by the package delivery unit and to execute the one or more rules in response to the access unit successfully communicating with the package delivery unit, wherein one of the rules is to activate the activatable open button if the authentication is successful.

17 Claims, 4 Drawing Sheets

ACCESS SYSTEM FOR A STRUCTURE

TECHNICAL FIELD

The present disclosure is directed to the field of access systems.

BACKGROUND

Every day more commerce is conducted online and goods are shipped to buyers' homes. Frequently, the buyer is not home when the packages arrive and the packages end up sitting on a porch for long periods of time. So-called "porch pirates" see this as an opportunity to steal valuable property that is lying unsecured in broad daylight for hours at a time. There is a need for increased security for delivered goods. There is also a need for increased security in garage doors.

SUMMARY

Embodiments of the present disclosure are directed to an access system for a structure including an alphanumeric keypad, a light, and an activatable open button. The access system is configured to open an access point to the structure when the button is pressed while active. The access system also includes an authentication module configured to communicate via Bluetooth with a package delivery unit when the package delivery unit reaches a predetermined delivery distance near the structure and to authenticate the package delivery unit. The access system also includes an execution module configured to store one or more rules pertaining to delivery of a package by the package delivery unit and to execute the one or more rules in response to the access system successfully communicating with the package delivery unit, wherein one of the rules is to activate the activatable open button if the authentication is successful.

Further embodiments of the present disclosure are directed to a method of granting access to a dwelling for delivery of a package. The method includes emitting an ultrahigh frequency (UHF) signal from an access system in an area around the access system near a door of the dwelling, and identifying a package entering the area by exchanging UHF signals between the access system and a package delivery unit. The method also includes executing a wireless authentication for the package delivery unit based on information exchanged over the UHF signal. If the wireless authentication fails, displaying a first visual cue of the failure at the access system, requesting input from the package delivery unit, and executing an input authentication for the package delivery unit using the input. If the input authentication fails, displaying a second visual cue of the failure at the access system that is distinguishable from the first visual cue. If either the wireless authentication or the input authentication succeeds, the method includes opening the door for the package delivery unit.

Still further embodiments of the present disclosure are directed to a system for receiving a package at a building from a delivery service such as UPS, FEDEX, or a similar carrier. The system includes an access system configured to communicate wirelessly with the delivery service and to open a door to the building. The access system is configured to authenticate the delivery service wirelessly when the delivery service arrives at the building. The system also includes an open button on the access system that is activated if the delivery service successfully authenticates wirelessly with the access system. The open button must be actuated by the delivery service after successfully authenticating. The system also includes a display component on the access system configured to display a visual cue indicating success or failure of the wireless authentication. If the wireless authentication fails the display component is configured to display a prompt to the delivery service to input an alphanumeric code to the access system. The system also includes an input mechanism on the access system configured to receive the alphanumeric code from the delivery service. The display component displays a visual cue of success and to activate the open button if the authentication using the alphanumeric code is successful. If the authentication using the alphanumeric code is unsuccessful the display component is configured to display a visual cue of failure. Upon successful authentication either wirelessly or using the alphanumeric code the open button is activated and actuating the open button causes a door to open. Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "package delivery unit" is meant to refer to a device, or vehicle or other structure that delivers a package to a dwelling. The package delivery unit is equipped with a wireless communication device capable of communicating with an access system according to embodiments of the present disclosure. The package delivery unit can include a transceiver on a delivery truck, a wireless device such as a personal digital assistant (PDA) carried by a delivery professional or by a delivery truck, or a communication module contained with the package itself.

As used herein, "delivery service" can refer to a delivery professional, a delivery truck, or a carrier of packages and mail such as AMAZON, UPS, USPS, FEDEX, etc.

As used herein, "keypad" can mean a hard keypad including a 10-digit keypad, a full qwerty keyboard, a series of arbitrary buttons, a touch-screen keying system, or other such input device.

Figure 1:
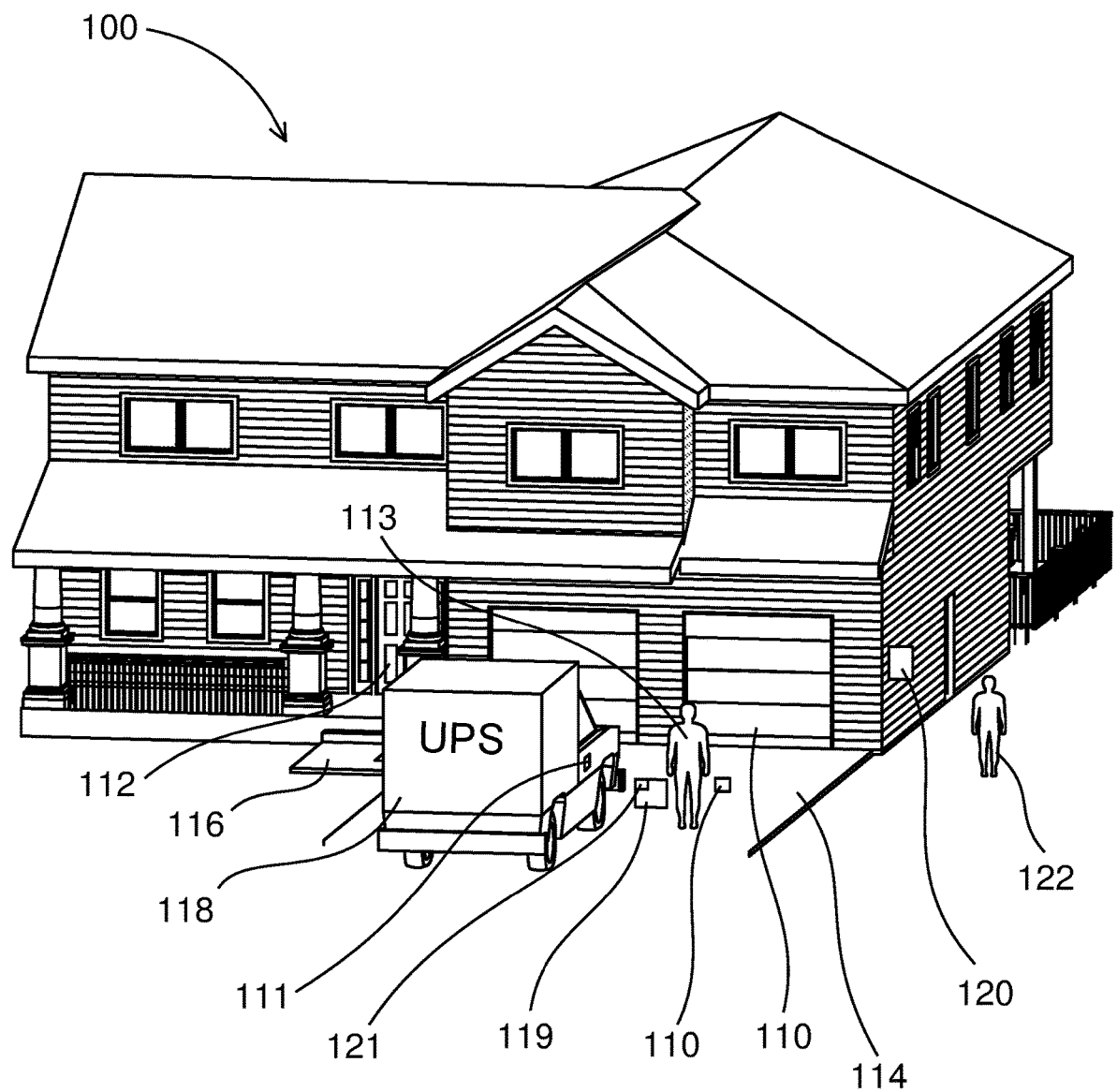
FIG. 1 shows a home with a garage door, a front door, a driveway, and an access system according to embodiments of the present disclosure.

Now referring to FIG. 1, a typical home 100 is shown with a garage door 110, a front door 112, a driveway 114, and a front walkway 116. Like most houses, deliveries are made to this house by a truck 118 operated by one of many common carriers such as UPS, FEDEX, USPS, AMAZON, etc. These companies are currently leaving valuable deliveries anywhere they want, usually near the door 112 or near the garage door 110. Without a system to allow them to secure the packages, there is a real risk that packages will be damaged, lost, or stolen.

According to the present disclosure, an access system 120 is used to allow selective, varying levels of access to delivery personnel and to other would-be entrants such as children 122 or pets. The access system 120 can be placed near an access point such as a front door 112, a garage door 110, a service door, or a window. The access point shown in this embodiment is a garage door 110. In the case of an apartment building or a multi-family dwelling such as a duplex or a townhouse, there may be multiple access points 120 at different doors or access points. The access system 120 is equipped with wireless transmission capabilities that communicate with the delivery personnel in various ways. For example, the delivery personnel 113 may carry a device such as a personal digital assistant (PDA) 124 such as a smartphone, iPad, or other such device. The truck 118 may also be equipped with similar wireless transmission capabilities such as by having a transceiver 111 installed in the truck or carried by the truck. In some embodiments the transmission range of these wireless capabilities is relatively short such that wireless communication is initiated between the access system 120 and the delivery personnel when the delivery personnel is near enough to the house 100 to deliver a package 119. There are many wireless protocols in use today, such as Bluetooth, Wi-Fi, radio, NFC, Infra-red, laser, etc. Any one or more of these protocols can be used to communicate with the access system 120. Bluetooth technology is preferably used and described herein without loss of generality. It is to be understood that other communication protocols may also be used.

In some embodiments the packages themselves come equipped with a communications module 121 that is configured to communicate with the access system 120 directly. In such cases, the communications module 121 on the packages can be retrieved by the delivery personnel once the package is delivered. Alternatively, the communications module 121 is built into the package 119 and the package with the module 121 is be picked up by the delivery personnel on the next run after the buyer has received and opened the package 119. In yet other embodiments, the module 121 is detached by the buyer and returned to the delivery company by being picked up, or returned to the vendor by mail or some other means. In these other embodiments, the communications modules 121 in the packages can come with a small deposit that is refunded to the buyer when the carrier regains possession of the communications modules 121 for use with other packages to encourage the buyer to care for and return the communications modules 121.

Figure 2:
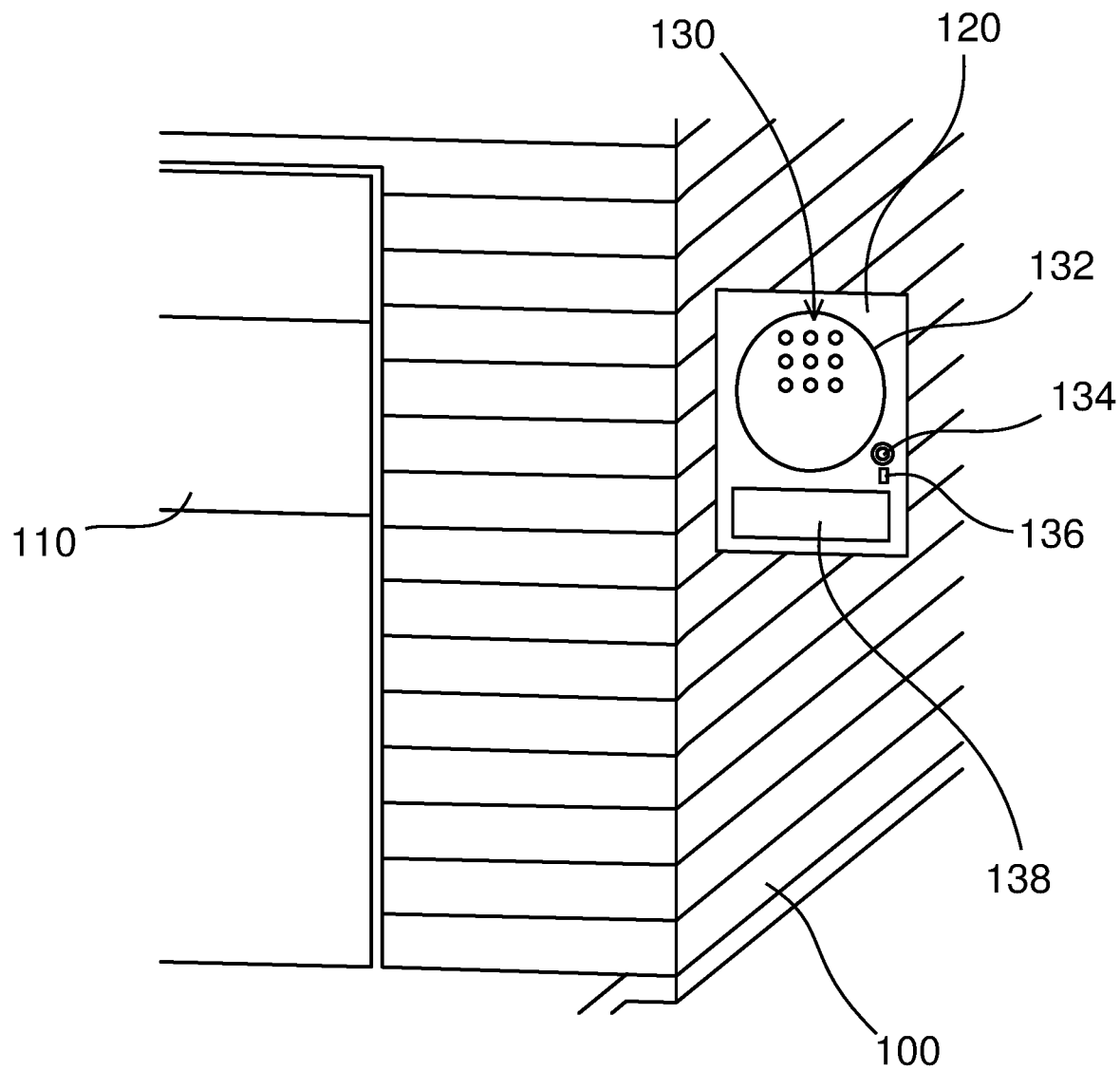
FIG. 2 shows an access system according to embodiments of the present disclosure.

FIG. 2 shows an access system 120 according to embodiments of the present disclosure. The access system 120 can be positioned near an entry point such as a garage door or a front door. The access system 120 includes a keypad 130 that can receive inputs in the form of alphanumeric inputs from the delivery personnel or others. Inputting a certain codes into the keypad 130 can cause the access system 120 to perform various actions relative to the door, such as opening a garage door fully or partially, unlocking the garage door, unlocking the front door, opening the front door, opening a specialty door coupled to the access system 120 designed exclusively for package deliveries, etc. The access system 120 also includes a light ring 132 that can illuminate in various patterns, flashes, colors, etc. to convey information to the delivery personnel. The access system 120 also can include a camera 134, a camera button 136, and an open button 138. The open button 138 can be selectively activatable. Without executing any authentication protocol, the open button 138 is not activated and pressing the button has no effect. When the open button 138 is activated by any of the many methods and systems disclosed herein, pressing the open button 138 opens a door, be it an overhead door, a service door, a window, or any other suitable access point.

When the delivery professional arrives at the house 100, the access system 120 receives a signal that a package has arrived at the house 100. The signal may come from the PDA 124, the truck 118, or from a communications module 121 on an individual package 119. The signal exchange between the access system 120 can be passive or active on the part of the access system 120, and the package or delivery mechanism can also be active or passive. In some embodiments at least one of the access module 120 and the delivery mechanism is active and the other may be passive or active.

In certain embodiments when the access system 120 receives a signal that a package is near and is to be delivered, the access system 120 can still require the delivery personnel to physically press the open button 138. In some embodiments the open button 138 and/or the light ring 132 may illuminate in a green color or another suitable color to indicate success or that the garage door 110 can be opened. Requiring the physical button press can help prevent a rare case where a package may be nearby but is not being delivered right then, causing the garage door to open when it is not time. It also makes theft more difficult if a would-be thief were to imitate a signal from a package and attempt to cause garage doors to open with a spoofed signal. In some embodiments the open button 138 can be behind a cover so the light ring 132 is obscured from view until the personnel is able to lift the cover. Once the open button 138 is pressed, the garage door can be opened by the access system 120 and the package can be delivered securely into the garage, out of sight for would-be thieves.

Figure 3:
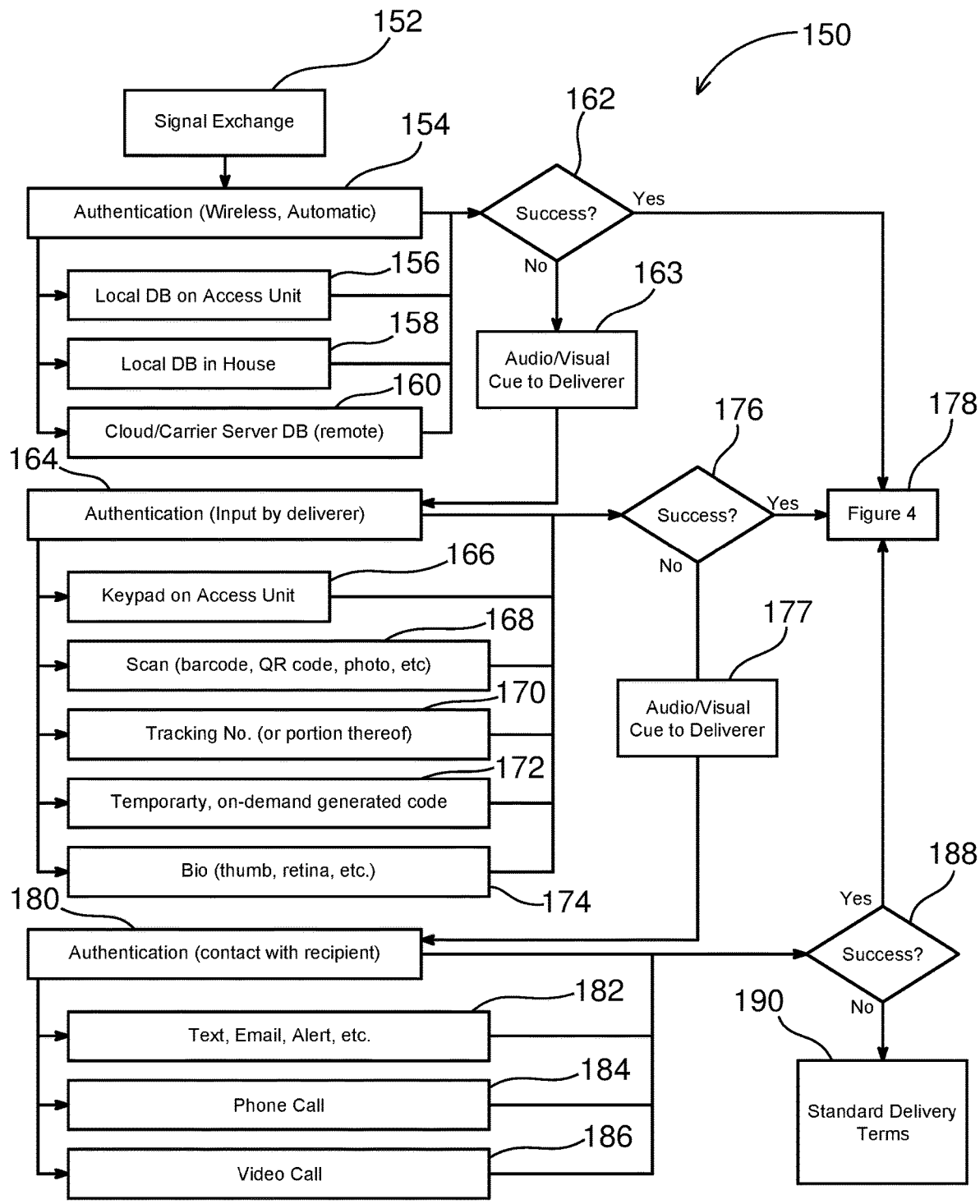
FIG. 3 is a block diagram showing a method for use with an Access system according to embodiments of the present disclosure.

FIG. 3 is a block diagram showing a method 150 for use with an aAccess system according to embodiments of the present disclosure. At 152 the signal exchange takes place. This can be done using a Bluetooth signal between the access system and one or more of the package itself (with communications module), a delivery truck, or a PDA of the delivery professional. The signal exchange is executed in delivery proximity, meaning the source of the signal is close enough to the access system that delivery is imminent. Different houses and properties will have different length of driveway or yard, so the actual distance may vary.

Authentication of the signal can take place in a layered series of protocols. The first of which is at 154, a wireless, automatic authentication. In some embodiments, the delivery mechanism has a Bluetooth module that automatically communicates with the access system and confirms the credentials of the delivery mechanism behind the scenes, invisible to the driver and to the recipient. The authentication credentials and logic can reside locally on a database or memory of the access system itself as at 156, in a server or other computing device in the house as in 158. In this case the access module may be able to communicate with the in-house server. Or the authentication can take place via communication between the carrier (UPS, FEDEX, etc.) server or cloud computing system. At 162 success or failure of the wireless, automatic authentication stage is determined. If success is achieved, the method at 178 will be described in greater detail with respect to FIG. 4 below. Authentication can be handled by an authentication module that is part of the access system 120 as shown in FIG. 2. The authentication calculations can take place on the access system 120, or remotely and be transmitted to the access system 120. In some embodiments, the authentication module is part of the package delivery unit, such as on the delivery person's smart phone. In some embodiments the authentication module can be an authentication executed by the delivery person on their device, such as using a password or biometric input such as fingerprint or facial recognition of the delivery person which can be executed at the delivery site as the package is delivered.

In some embodiments there is an authentication module that is part of the access system that is configured to receive an authentication from the package delivery unit. Trust between the authentication module on the access system and the authentication protocol used by the package delivery unit can be established ahead of time, or can be executed in the moment of delivery.

If the first authentication stage fails, at 163 an audio and/or visual cue can be delivered to the deliverer which can include a light, a sound, a text display, or any suitable combination thereof to advise the deliverer that the authentication has not succeeded and that further input is required.

At 164 the second stage of authentication by deliverer input begins. The deliverer can provide input in the form of a code input via the keypad at 166, the deliverer can scan a barcode, QR code, or take a photograph at 168. At 170 the input can be a tracking number or other suitable alphanumeric code or portion thereof. At 172 a temporary, on-demand generated code can be created by the access system (or at least initiated by the access system) or by a remote service and conveyed to the delivery professional. At 174 a biometric input can be used, such as a thumb print, a retina scan, or other biometric authentication means. One or more of these authentication techniques can be used in any desired order. At 176 the success or failure of these delivery input authentication attempt(s) is determined. If success, at 178 move to FIG. 4 as described below.

If the delivery input authentication fails, at 177 an audio and/or visual cue can be given to the delivery professional. This second cue can be more severe than the first. At 180 a third layer of authentication is initiated by contacting the recipient via text, email, or alert at 182, by phone call at 184, or by video call at 186. In some embodiments this third stage of authentication can be selected to be used for special, more valuable deliveries because many people would consider a phone call or text to be more intrusive than a delivery is expected to be. In some embodiments the recipient can select which of these authentication methods to be implemented for all deliveries. The recipient can set a dollar value above which additional authentication methods are used automatically. In some embodiments the carrier can make this selection in coordination with recipient's preferences.

At 188 the third authentication method is judged a success or failure. If failure, at 190 the carrier can simply leave the package near the door if the terms of the delivery so permit. If success, the method continues as follows.

Figure 4:
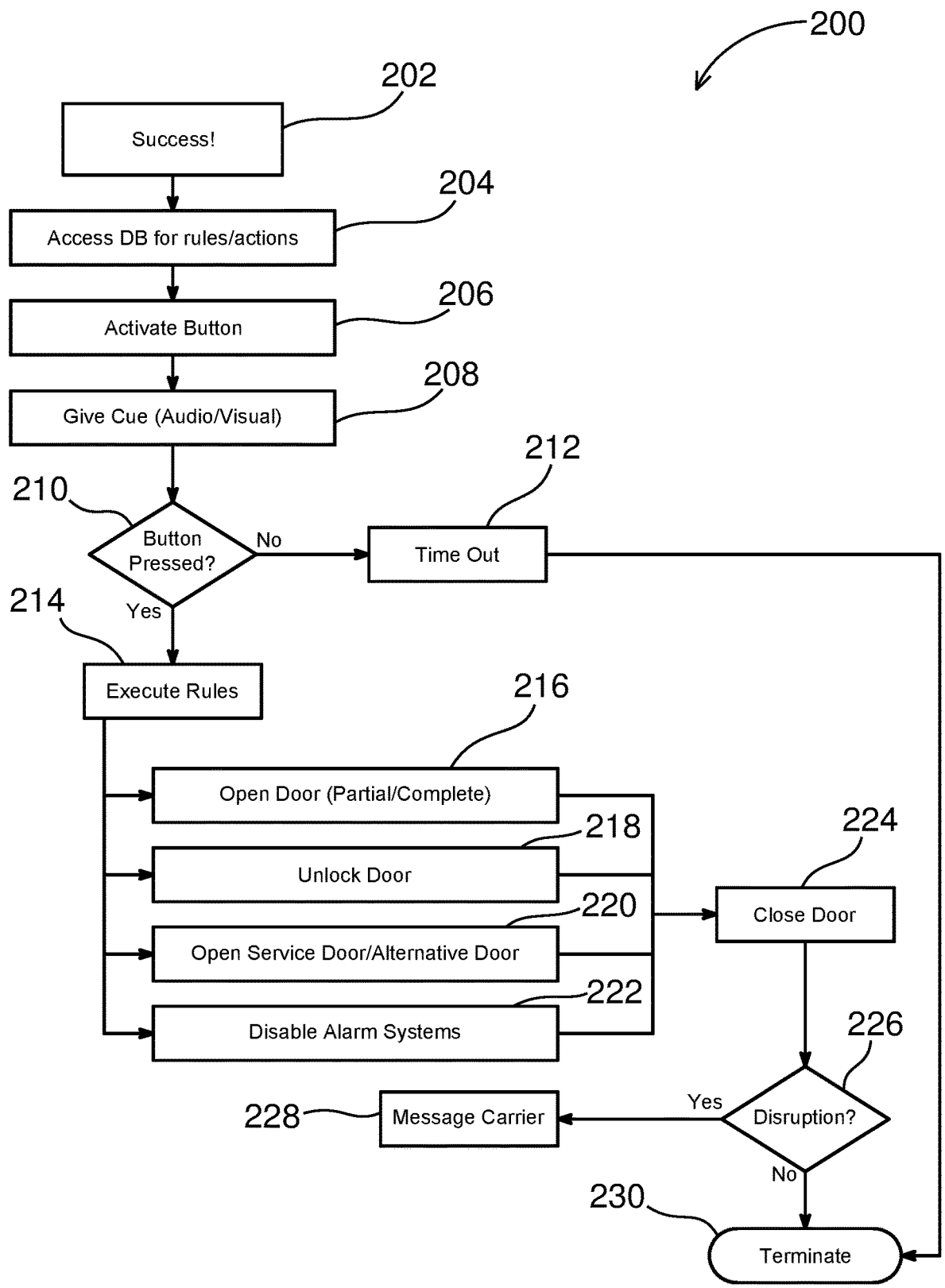
FIG. 4 is a block diagram of a method for use with an access system according to embodiments of the present disclosure.

FIG. 4 is a block diagram of a method 200 for use with an access system according to embodiments of the present disclosure after a package delivery unit has successfully provided sufficient credentials to the access system. At 202 the indication of success is received. At 204 the access system can access a database for rules on how to proceed which can vary for each delivery and each package. The database for the rules can be local to the access system, local in the house, or stored on a remote server operated by the delivery carrier or another third-party service. At 206 the button is activated. This button can be the open button 138 shown in FIG. 2. At 208 an audio and/or visual cue is given. This can include lighting the button with a green color or another color that indicates success such as blue or white. At 210 the button enters a wait state until it either times out at 212 and terminates at 230 or is pressed at 214 and rules are executed.

The rules at 214 can be executed according to directions and preferences of the recipient. There are several actions that the access system can initiate or execute, one or more of which can be executed in any suitable order. It is worth reminding the reader here that the systems and methods of the present disclosure can be used with a garage door or a man door or any other access point to a dwelling or structure without limitation despite specific mention of garage doors made for conciseness and clarity. At 216 a garage door can be opened. At 218 the door can be unlocked. At 220 a service door can be opened. A service door can be a cellar door, a back door, or an alternative door. In some embodiments the access system can advise the delivery professional that such alternative access exists. For example, the access system can include a LCD screen that displays a message such as "walk around back and lift the doggie door please and thank you." At 222 alarms can be disabled to allow the delivery. Such disabling can be temporary.

A recipient can arrange which of these rules he or she prefers. In some embodiments the access system is configured to communicate with intelligent home systems such as thermostats, locks, garage doors, etc. Control can pass to from the access system to these intelligent systems to allow the recipient even greater control over how the delivery is executed.

At 224 after executing the rules the door is closed. At 226 the access door can monitor for a disruption in closing the door. In some embodiments this can entail a garage door safety mechanism such as an optical sensor at the bottom of the garage door opening. If there is such a disruption, at 228 the access system can message the carrier and inform them of the disruption. If no such disruption is found, at 230 the method can terminate.

The invention has been described with reference to various specific and preferred embodiments and techniques. Nevertheless, it is understood that many variations and modifications may be made while remaining within the spirit and scope of the invention.

What is claimed is:

1. An access system for a structure, comprising:
   a keypad;
   an activatable open button, wherein the access unit is configured to open an access point to the structure when the button is pressed while active;
   an authentication module configured to communicate via Bluetooth with a package delivery unit when the package delivery unit reaches a predetermined delivery distance near the structure and to authenticate the package delivery unit; and
   an execution module configured to store one or more rules pertaining to delivery of a package by the package delivery unit and to execute the one or more rules in response to the access system successfully communicating with the package delivery unit, wherein one of the rules is to activate the activatable open button if the authentication module is able to authenticate the package delivery unit, wherein the authentication module is configured to present:
   a first authentication protocol comprising wireless, automatic electronic exchange of information;
   if the first authentication protocol fails, a second authentication protocol including requiring manual input from a delivery professional package delivery unit;
   if the second authentication protocol fails, a third authentication protocol including contacting an intended recipient of the package;
   wherein the authentication module is configured to receive a preference from a user for which one or more of the first and second authentication methods to execute.

2. The access system of claim 1 wherein the authentication module is configured to present,
   if the second authentication protocol fails, a third authentication protocol including contacting an intended recipient of the package.

3. The access system of claim 1, wherein the authentication module is configured to receive a preference from a user for which one or more of the first and second authentication method to execute and in which order.

4. The access system of claim 1 wherein the first authentication protocol comprises exchanging information with one or more of a database stored on the access system, a database at the structure, or a remote database.

5. The access system of claim 1 wherein the second authentication protocol comprises receiving at least one of:
   a keypad entry;
   all or a portion of a tracking number provided by the package delivery unit;
   a scan of one or more of a barcode, QR code, or photograph taken by the package delivery unit;
   entry of a code generated in response to the access system successfully communicating with the package delivery unit; or
   a biometric input.

6. The access system of claim 3 wherein the third authentication protocol comprises contacting a recipient of the package.

7. The access system of claim 3 wherein the access system is configured to deliver a visual cue corresponding to success or failure of each of the first, second, or third authentication protocols.

8. The access system of claim 7 wherein the visual cue is different for failure of each of the first, second, or third authentication protocols.

9. The access system of claim 1 wherein the access point comprises at least one of a man door, a garage door, a service door, or a window.

10. An access system for a structure, comprising:
    a keypad;
    an activatable open button, wherein the access unit is configured to open an access point to the structure when the button is pressed while the button is active;
    an authentication module configured to communicate via Bluetooth with a package delivery unit when the package delivery unit reaches a predetermined delivery distance near the structure and to authenticate the package delivery unit, wherein the authentication module is configured to present:
    a first authentication protocol comprising a wireless, automatic electronic exchange of information; and
    a second authentication protocol comprising at least a manual input via the keypad;
    wherein the authentication module is further configured to receive a preference from a user for an order in which to present the first or second authentication protocols; and
    an execution module configured to store one or more rules pertaining to delivery of a package by the package delivery unit and to execute the one or more rules in response to the access system successfully communicating with the package delivery unit, wherein one of the rules is to activate the activatable open button if the authentication module is able to authenticate the package delivery unit via the first or second authentication protocols.

11. The access system of claim 10, wherein the first authentication protoclol comprises exchanging information with one or more of a database stored on the access system, a database at the structure, or a remote database.

12. The access system of claim 10, the authentication module further comprising a third authentication protocol comprising contacting an intended recipient of the package.

13. The access system of claim 12 wherein the authentication module is further configured to receive a preference from a user for an order in which to present the first, second, or third authentication protocols.

14. The access system of claim 10 wherein the second authentication protocol comprises receiving at least one of:
    a keypad entry;
    all or a portion of a tracking number provided by the package delivery unit;
    a scan of one or more of a barcode, QR code, or photograph taken by the package delivery unit;

entry of a code generated in response to the access system successfully communicating with the package delivery unit; or a biometric input.

15. The access system of claim 10 wherein the access system is configured to delivery a visual cue corresponding to success or failure of each of the first or second authentication protocols.

16. The access system of claim 10 wherein the visual cue is different for failure of each of the first, second, or third authentication protocols.

17. The access system of claim 10 wherein the access point comprises at least one of a man door, a garage door, a service door, or a window.

* * * * *